US009919958B2

(12) United States Patent
Hawtof et al.

(10) Patent No.: US 9,919,958 B2
(45) Date of Patent: Mar. 20, 2018

(54) GLASS SHEET AND SYSTEM AND METHOD FOR MAKING GLASS SHEET

(71) Applicant: CORNING INCORPORATED, Corning, NY (US)

(72) Inventors: Daniel Warren Hawtof, Corning, NY (US); Nathan Michael Hill, Tunkhannock, PA (US); Eric Yun Kuei Lynn, Easton, PA (US); Catherine Michiko Magee, Short Hills, NY (US); Brent Allen Noll, Painted Post, NY (US); Daniel Roberto Shneyer, San Francisco, CA (US); Steven Bryan Shooter, Lewisburg, PA (US)

(73) Assignee: Corning Incorporated, Corning, NY (US)

( * ) Notice: Subject to any disclaimer, the term of this patent is extended or adjusted under 35 U.S.C. 154(b) by 106 days.

(21) Appl. No.: 14/799,201

(22) Filed: Jul. 14, 2015

(65) Prior Publication Data
US 2016/0016844 A1    Jan. 21, 2016

Related U.S. Application Data

(60) Provisional application No. 62/025,627, filed on Jul. 17, 2014.

(51) Int. Cl.
*B05D 3/00* (2006.01)
*C03C 14/00* (2006.01)
*C03C 23/00* (2006.01)
*C03C 17/00* (2006.01)
*C03B 19/14* (2006.01)

(52) U.S. Cl.
CPC .......... *C03C 14/00* (2013.01); *C03B 19/1492* (2013.01); *C03C 17/002* (2013.01); *C03C 23/0095* (2013.01); *C03C 2214/12* (2013.01); *C03C 2214/30* (2013.01)

(58) Field of Classification Search
CPC ..................................................... C03C 14/00
USPC ..................................................... 427/398.1
See application file for complete search history.

(56) References Cited

U.S. PATENT DOCUMENTS

| 4,491,392 | A | * | 1/1985 | Elmer | ................ G02F 1/1525 359/265 |
| 5,110,505 | A | * | 5/1992 | Herron | ................ C03C 14/006 252/519.34 |
| 6,736,633 | B1 | | 5/2004 | Dawson-Elli et al. | |
| 6,743,011 | B2 | | 6/2004 | Bakshi et al. | |
| 6,837,076 | B2 | | 1/2005 | Hawtof | |
| 7,677,058 | B2 | | 3/2010 | Hawtof | |
| 8,438,876 | B2 | | 5/2013 | Noni, Jr. | |
| 8,656,737 | B2 | | 2/2014 | Nakamura et al. | |

(Continued)

FOREIGN PATENT DOCUMENTS

| JP | 2011190475 A | 9/2011 |
| JP | 2013-237159 A | 11/2013 |

(Continued)

*Primary Examiner* — Tabatha Penny
(74) *Attorney, Agent, or Firm* — Russell S. Magaziner; Michael A. Hood

(57) ABSTRACT

A method includes impregnating a region of a glass sheet with a filler material in a liquid state. The glass sheet includes a plurality of glass soot particles. The filler material is solidified subsequent to the impregnating step to form a glass/filler composite region of the glass sheet.

20 Claims, 4 Drawing Sheets

(56) References Cited

U.S. PATENT DOCUMENTS

| | | |
|---|---|---|
| 2003/0113679 A1 | 6/2003 | Bakshi et al. |
| 2003/0167796 A1 | 9/2003 | Hawtof |
| 2008/0280057 A1 | 11/2008 | Hawtof et al. |
| 2010/0124709 A1 | 5/2010 | Hawtof et al. |
| 2010/0143601 A1 | 6/2010 | Hawtof et al. |
| 2010/0291346 A1 | 11/2010 | Hawtof et al. |
| 2011/0023548 A1 | 2/2011 | Garner et al. |
| 2011/0223408 A1 | 9/2011 | Kadomura |
| 2011/0232330 A1* | 9/2011 | Noni, Jr. ............ C03B 19/1492 65/61 |
| 2012/0040146 A1 | 2/2012 | Garner et al. |
| 2013/0218281 A1 | 8/2013 | Broadley et al. |

FOREIGN PATENT DOCUMENTS

| | | |
|---|---|---|
| KR | 10-2014-0021527 | 2/2014 |
| WO | 2011136810 A1 | 11/2011 |
| WO | 2014034013 A1 | 6/2014 |

* cited by examiner

GLASS SHEET AND SYSTEM AND METHOD FOR MAKING GLASS SHEET

This application claims the benefit of priority to U.S. Provisional Application 62/025,627 filed on Jul. 17, 2014 the content of which is incorporated herein by reference in its entirety.

BACKGROUND

1. Field

This disclosure relates to glass sheets, and more particularly to glass soot sheets and systems and methods for making glass soot sheets.

2. Technical Background

A glass sheet can be formed using a variety of different processes. For example, glass soot particles can be deposited on a rotating drum to form a glass soot sheet. The glass soot sheet can be released from the drum and sintered into densified glass.

SUMMARY

Disclosed herein are glass sheets and systems and methods for making glass sheets.

Disclosed herein is a method comprising impregnating a region of a glass sheet with a filler material in a liquid state. The glass sheet comprises a plurality of glass soot particles. The filler material is solidified subsequent to the impregnating step to form a glass/filler composite region of the glass sheet.

Also disclosed herein is a system comprising a glass sheet forming unit and a filler application unit. The glass sheet forming unit is configured to form a glass sheet comprising a plurality of glass soot particles. The filler application unit is configured to impregnate a region of the glass sheet with a filler material in a liquid state to form an impregnated region of the glass sheet.

Also disclosed herein is a glass sheet comprising a first region and a second region. The first region comprises a glass/filler composite comprising a plurality of glass soot particles and a filler material in a solid state disposed within voids between the glass soot particles. The second region is substantially free of the filler material.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
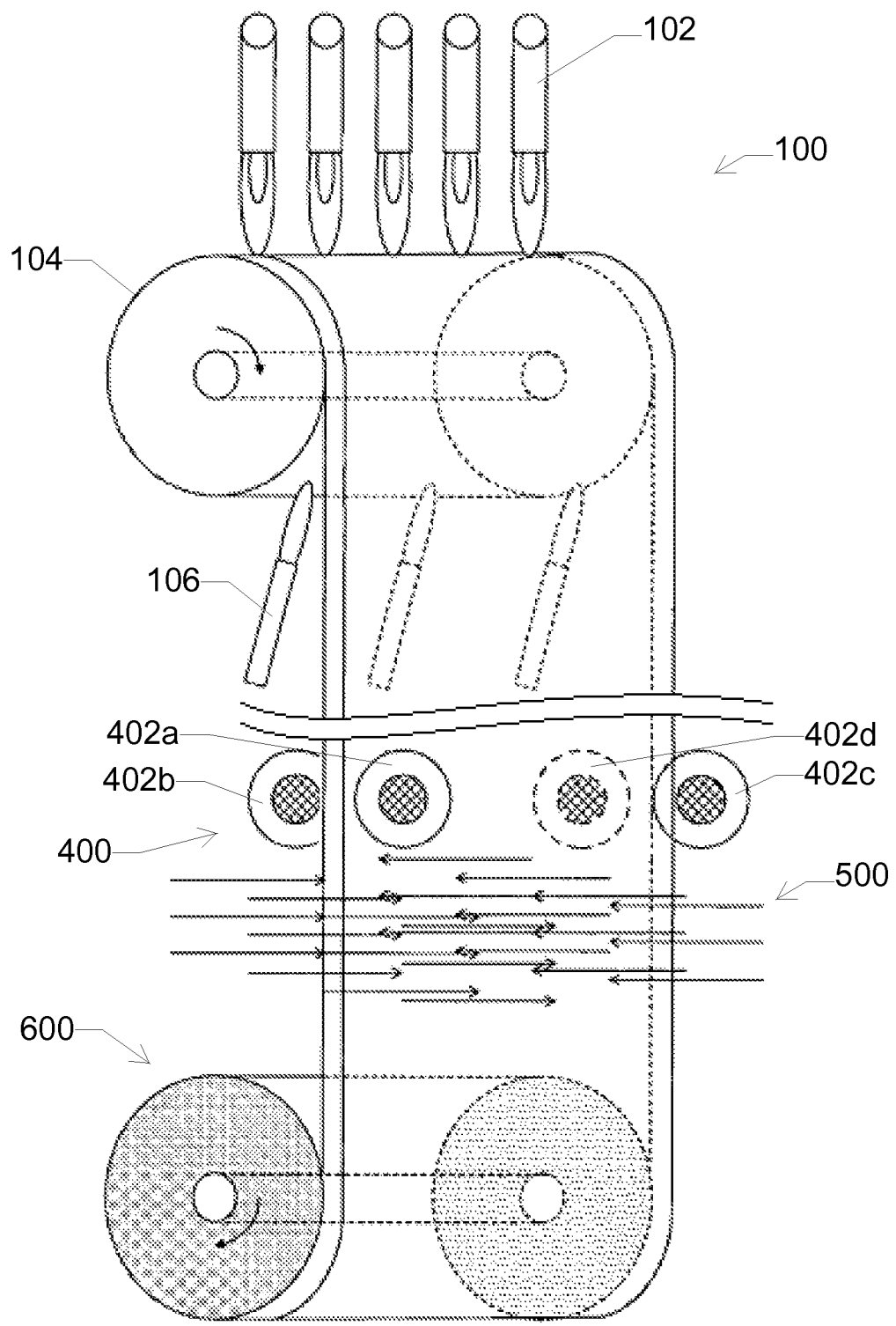
FIG. 1 is a schematic illustration of one exemplary embodiment of a glass sheet forming unit.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

In various embodiments, a glass sheet comprises a plurality of glass soot particles. A region of the glass sheet is impregnated with a filler material in a liquid state. For example, interstitial voids within the region of the glass sheet are filled with the filler material in the liquid state. The filler material is solidified to form a glass/filler composite region of the glass sheet. The glass/filler composite region of the glass sheet can be more durable (e.g., under bending) than a region of the glass sheet that is substantially free of the filler material. Thus, the glass sheet can be engaged at the glass/filler composite region (e.g., with a glass sheet guiding device) without causing substantial damage to the glass sheet. The durability of the glass sheet can enable further processing of the glass sheet, such as sintering the glass sheet to form a densified glass sheet and/or reeling the glass sheet onto a roll.

As used herein, the term "glass sheet," unless specifically indicated otherwise, refers to sheet materials comprising a plurality of glass soot particles (i.e., soot sheets); sheet materials comprising consolidated, sintered, or densified glass (i.e., densified glass sheets); or combinations thereof (e.g., a sheet comprising one or more glass soot regions and one or more densified glass regions).

A soot sheet is a sheet material comprising at least one soot layer, wherein the glass soot particles are connected and/or bonded with at least some of the other glass soot particles proximate thereto. For example, the glass soot particles are at least partially melted together with at least some of the other glass soot particles proximate thereto during forming of the glass sheet. A soot sheet comprises voids at the boundaries of at least some of the glass soot particles. In some embodiments, impregnating a glass sheet with a filler material comprises filling at least some of the voids in the soot sheet with the filler material as described herein.

A densified glass sheet can be completely or partially densified. A completely densified glass sheet is substantially free of voids in the material, and the density of the glass reaches a maximum at a given temperature and pressure. Densified glass comprises a density of at least about 95%, at least about 98%, at least about 99%, or at least about 99.9% of the highest possible density ($D_{max}$) of a glass material having the same chemical composition and microstructure under STP conditions (i.e., a pressure of 101.325 kPa and a temperature of 273 K).

A sheet comprises two continuous surfaces (i.e., major surfaces) with areas larger than the other surfaces (i.e., edge surfaces). In some embodiments, the areas of the major surfaces are at least 5 times the area of the third largest surface. The distance between the two major surfaces at a particular location is referred to as the thickness of the sheet at that location. In some embodiments, the two major surfaces are substantially parallel with each other when the sheet is laid on the surface of a flat substrate. Thus, the sheet has a substantially uniform thickness across the major surfaces. In other embodiments, the two major surfaces can be non-parallel to each other, and the thickness of the sheet can vary from location to location. Each of the major surfaces of the sheet can be planar or curved.

In some embodiments, a system comprises a glass sheet forming unit configured to form a glass sheet comprising a plurality of glass soot particles using a suitable forming process. FIG. 1 is a schematic illustration of one exemplary embodiment of a glass sheet forming unit 100. Glass sheet forming unit 100 can be configured as described in U.S. Pat. No. 7,677,058, which is incorporated by reference herein in its entirety. For example, glass sheet forming unit 100 comprises a soot-providing device 102. Soot-providing device 102 comprises a suitable device for providing glass soot particles such as, for example, one or more flame hydrolysis burners (e.g., those typically used in inside vapor deposition (IVD), outside vapor deposition (OVD), vapor axial deposition (VAD), or planar deposition processes), plasma heated soot sprayers, or combinations thereof.

The glass soot particles comprise one or more glass components (e.g., metal oxides), that can be doped or non-doped. In some embodiments, the glass soot particles comprise doped or non-doped silica. In some embodiments, silicon-containing precursor compounds, such as, for example, octamethylcyclotetrasiloxane (OMCTS) are introduced into a flame of $H_2$, $CH_4$ and/or another suitable fuel. OMCTS is oxidized and hydrolyzed in the flame to produce fine silica soot particles.

Glass sheet forming unit 100 comprises a deposition surface 104. Glass soot particles from soot-providing device 102 are deposited on deposition surface 104 to form the glass sheet comprising glass soot particles. For example, in the embodiment shown in FIG. 1, deposition surface 104 comprises a curved outer surface of a deposition drum. In some embodiments, the deposition drum comprises a substantially cylindrical shape. Additionally, or alternatively, the deposition drum comprises a suitable transverse cross-sectional shape such as, for example, circular, elliptical, triangular, rectangular, or another polygonal or non-polygonal shape. The deposition drum is rotatable about a rotation axis. In other embodiments, deposition surface 104 can comprise another suitable configuration including, for example, an outer surface of a planar or curved deposition plate.

In some embodiments, deposition surface 104 comprises a refractory material. For example, in some embodiments, the deposition drum comprises a core and a clad comprising different materials. The core can comprise steel, aluminum, or a combination thereof. Additionally, or alternatively, the clad can comprise silica, graphite, zircon, zirconia, or a combination thereof. In other embodiments, the deposition drum comprises a unitary body.

The glass sheet comprising glass soot particles is released from deposition surface 104. For example, in some embodiments, the glass sheet remains on deposition surface 104 until the deposition process is complete and then the glass sheet is removed from the deposition surface. In other embodiments, the glass sheet is continuously removed from deposition surface 104 during the deposition process. For example, the deposition drum is rotated during the deposition of glass soot particles thereon, and the glass sheet is moved continuously in a longitudinal direction to remove the glass sheet from the deposition drum. Thus, a distal portion of the glass sheet is moved away from the deposition drum while a proximal portion of the glass sheet remains attached to the deposition drum to enable continuous production of a long ribbon of glass sheet.

In some embodiments, glass sheet forming unit 100 comprises one or more soot sheet releasing devices 106 to aid in removing the glass sheet from deposition surface 104. Soot sheet releasing device 106 comprises a suitable releasing device such as, for example, a knife, a chisel, a cutting wire or thread, a gas jet, or combinations thereof. In some embodiments, soot sheet releasing device 106 is configured as described in U.S. Pat. No. 8,438,876, which is incorporated by reference herein in its entirety.

Figure 2:
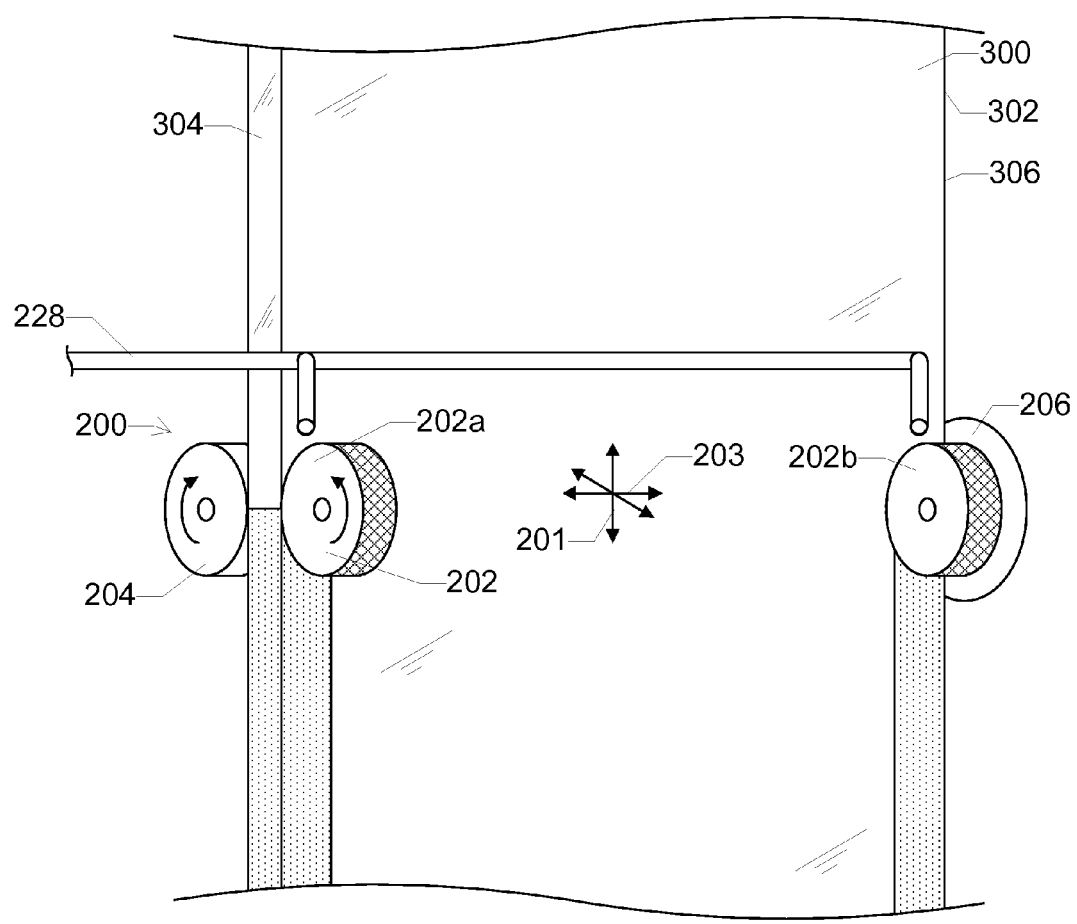
FIG. 2 is a schematic illustration of one exemplary embodiment of a filler application unit that can be used with the glass sheet forming unit of FIG. 1.

In some embodiments, the system comprises a filler application unit configured to impregnate a region of the glass sheet with a filler material in a liquid state to form an impregnated region of the glass sheet. FIG. 2 is a schematic illustration of one exemplary embodiment of a filler application unit 200. In some embodiments, filler application unit 200 is positioned downstream of glass sheet forming unit 100 in a longitudinal direction. The longitudinal direction is indicated in FIG. 2 by double-headed arrow 201. Thus, the glass sheet is removed from deposition surface 104 and advanced longitudinally to filler application unit 200. Additionally, or alternatively, filler application unit 200 is positioned upstream of a glass sheet guiding unit in the longitudinal direction. The glass sheet guiding unit can engage the impregnated region of the glass sheet without causing substantial damage to the glass sheet.

Filler application unit 200 comprises one or more applicator members 202. In some embodiments, applicator member 202 is configured to engage the glass sheet to apply the filler material to the glass sheet. For example, in some embodiments, applicator member 202 comprises one or more applicator rolls as shown in FIG. 2. In other embodiments, applicator member 202 can comprise one or more applicator belts, applicator brushes, applicator pads, or other suitable applicator devices. Applicator member 202 engages a first major surface 300 of the glass sheet to apply the filler material to the glass sheet. In other embodiments, the applicator member is configured to apply the filler material to the glass sheet without contacting the glass sheet. For example, the applicator member comprises a spray nozzle or a drip nozzle.

In some embodiments, filler application unit 200 comprises one or more backing members 204. Backing member 204 is positioned opposite applicator member 202 and configured to engage the glass sheet to provide support to the glass sheet during application of the filler material. In some embodiments, backing member 204 comprises one or more backing rolls as shown in FIG. 2. In other embodiments, backing member 204 can comprise one or more backing belts, backing brushes, backing pads, or other suitable backing devices. Backing member 204 engages a second major surface 302 of the glass sheet opposite first major surface 300.

In some embodiments, the glass sheet is positioned between applicator member 202 and backing member 204 as shown in FIG. 2. For example, the glass sheet is moved longitudinally between applicator member 202 and backing member 204 such that the applicator member and the backing member progressively engage a region of the glass sheet extending longitudinally along the glass sheet. Longitudinal movement of the glass sheet relative to applicator member 202 and backing member 204 can be caused by moving the glass sheet while maintaining the applicator member and the backing member stationary; by moving the applicator member and the backing member while maintaining the glass sheet stationary; or by moving the applicator member, the backing member, and the glass sheet.

In some embodiments, applicator member 202 is configured to rotate about an axis of rotation. Thus, applicator member 202 rolls along first major surface 300 of the glass sheet as the glass sheet is moved longitudinally relative to the applicator member. Additionally, or alternatively, backing member 204 is configured to rotate about an axis of rotation. Thus, backing member 204 rolls along second major surface 302 of the glass sheet as the glass sheet is moved longitudinally relative to the backing member. In some embodiments, rotation of applicator member 202 and/or backing member 204 is active. For example, applicator member 202 and/or backing member 204 are caused to rotate by a suitable driving unit including, for example, an electric motor, a hydraulic motor, a pneumatic motor, or combinations thereof. In other embodiments, rotation of applicator member 202 and/or backing member 204 is passive. For example, applicator member 202 and/or backing member 204 are caused to rotate by relative movement of the glass sheet.

In some embodiments, applicator member 202 has a length (e.g., extending in a transverse direction) that is less than a width of the glass sheet as shown in FIG. 2. Thus, the region of the glass sheet engaged by applicator member 202 has a width that is less than the width of the glass sheet. In other embodiments, the applicator member has a length that is greater than or equal to the width of the glass sheet. Thus, the region of the glass sheet engaged by the applicator member extends across substantially the entire width of the glass sheet.

Figure 3:
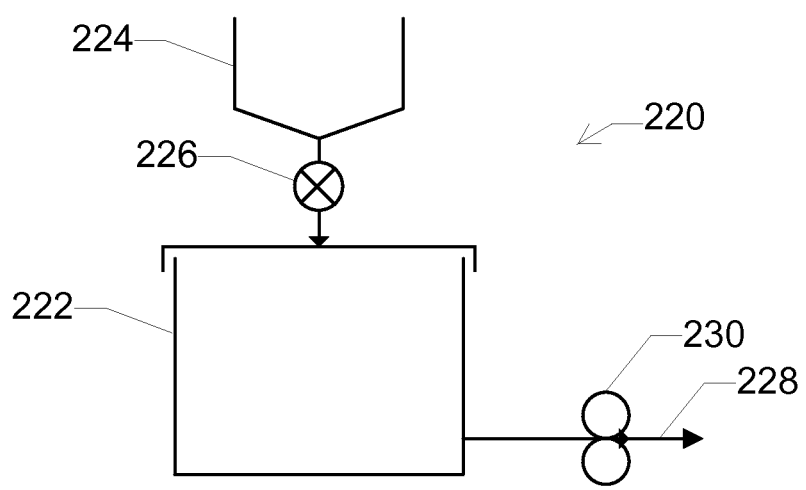
FIG. 3 is a schematic illustration of one exemplary embodiment of a filler delivery unit that can be used with the filler application unit of FIG. 2.

The filler material in the liquid state is delivered to filler application unit 200 for application to the glass sheet. For example, in some embodiments, the system comprises a filler delivery unit. FIG. 3 is a schematic illustration of one exemplary embodiment of a filler delivery unit 220 configured to deliver the filler material in the liquid state to filler application unit 200. In some embodiments, filler delivery unit 220 comprises a filler melting unit 222 configured to heat the filler material to a temperature above a melting temperature of the filler material to form the filler material in the liquid state. In some embodiments, filler melting unit 222 comprises a heated vessel such as, for example, a jacketed vessel, a vessel comprising a heating element coupled to the vessel, or combinations thereof. The temperature of filler melting unit 222 is adjustable to control the temperature of the filler material within the filler melting unit. For example, the temperature of filler melting unit 222 is controllable to maintain the filler material within the filler melting unit at a desired temperature that is higher than the melting temperature of the filler material. In some embodiments, the temperature of filler melting unit 222 is controllable to maintain the filler material within the filler melting unit at a temperature of about 100° C. to about 150° C. Additionally, or alternatively, the temperature of filler melting unit 222 is controllable to maintain the filler material within the filler melting unit at a temperature of about 10° C. above the melting point of the filler material to about 50° C. above the melting point of the filler material.

In some embodiments, filler delivery unit 220 comprises a solid filler delivery unit 224 configured to store the filler material in the solid state and/or to deliver the filler material in the solid state to filler melting unit 222. For example, in the embodiment shown in FIG. 3, solid filler delivery unit 224 comprises a solid filler hopper. The filler material in the solid state can be configured, for example, as pellets, beads, powder, or combinations thereof. The filler material in the solid state is fed to filler melting unit 222. For example, in the embodiment shown in FIG. 3, filler delivery unit 220 comprises a solid filler metering unit 226 positioned between solid filler delivery unit 224 and filler melting unit 222. Filler metering unit 226 can comprise a suitable metering device such as, for example, a rotary valve, a rotary feeder, an airlock, a slide gate, a metering conveyor (e.g., a screw conveyor or a belt conveyor), or combinations thereof. In other embodiments, solid filler delivery unit 224 and/or filler metering unit 226 are omitted. For example, the filler material in the solid state can be added directly (e.g., manually added) to filler melting unit 222. Filler melting unit 222 is configured to receive the filler material in the solid state and heat the filler material to a temperature above the melting temperature of the filler material to form the filler material in the liquid state.

In some embodiments, filler delivery unit 220 comprises a filler delivery tube 228 coupled to filler melting unit 222 and configured to transport the filler material in the liquid state from the filler melting unit to filler application unit 200. Filler delivery tube 228 can comprise a suitable conduit such as, for example, metal piping or tubing, polymeric piping or tubing, or combinations thereof. Filler delivery tube 228 comprises a suitable size to deliver the desired amount of the filler material. For example, filler delivery tube 228 comprises a diameter of about 3 mm (e.g., ⅛ in tubing) to about 13 mm (e.g., ½ in tubing). In some embodiments, filler delivery tube 228 comprises a heated tube configured to maintain the filler material in the filler delivery tube in the liquid state. For example, filler delivery tube 228 comprises a suitable heating unit such as, for example, heat trace. In some embodiments, the temperature of filler delivery tube 228 is controllable to maintain the filler material within the filler delivery tube at a temperature of about 100° C. to about 150° C. Additionally, or alternatively, the temperature of filler delivery tube 228 is controllable to maintain the filler material within the filler delivery tube at a temperature of about 10° C. above the melting point of the filler material to about 50° C. above the melting point of the filler material.

In the embodiment shown in FIG. 3, filler delivery unit 220 comprises a filler pump 230. Filler pump 230 comprises a suitable pumping device such as, for example, a positive displacement pump (e.g., a peristaltic pump, a diaphragm pump, a piston pump, a gear pump, or a rotary lobe pump) or a centrifugal pump. In other embodiments, filler pump 230 is omitted, and the filler material in the liquid state flows through filler delivery tube 228 by gravity flow. In some embodiments, the flow rate of the filler material in the liquid state through filler delivery tube 228 is controlled by filler pump 230. For example, the speed of filler pump 230 is adjustable to control the flow rate of the filler material through filler delivery tube 228. Additionally, or alternatively, filler delivery tube 228 comprises a flow control valve that is adjustable to control the flow rate of the filler material through the filler delivery tube. The flow control valve can be adjusted manually or automatically (e.g., in response to a flow control sensor).

Figure 4:
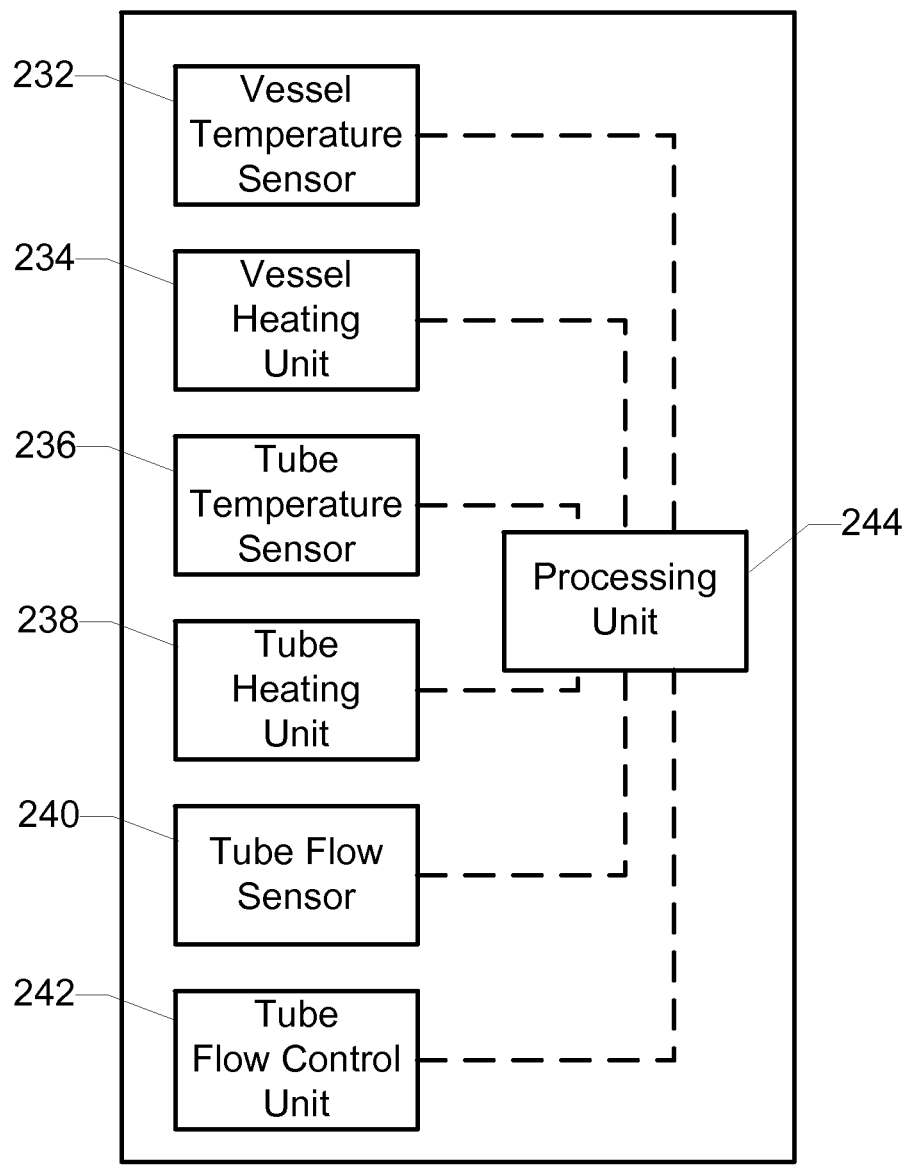
FIG. 4 is a block diagram of one exemplary embodiment of a filler delivery unit that can be used with the filler application unit of FIG. 2.

FIG. 4 is a block diagram of one exemplary embodiment of filler delivery unit 220. In some embodiments, filler delivery unit 220 comprises a vessel temperature sensor 232 that is configured to determine the temperature of filler melting unit 222 and/or the filler material within the filler melting unit. Additionally, or alternatively, filler delivery unit 220 comprises a vessel heating unit 234 that is configured to adjust the temperature of filler melting unit 222 and/or the filler material within the filler melting unit (e.g., by adjusting the amount of power or the flow of heating fluid to the filler melting unit). Additionally, or alternatively, filler delivery unit 220 comprises a tube temperature sensor 236 that is configured to determine the temperature of filler delivery tube 228 and/or the filler material within the filler delivery tube. Additionally, or alternatively, filler delivery unit 220 comprises a tube heating unit 238 that is configured to adjust the temperature of filler delivery tube 228 and/or the filler material within the filler delivery tube (e.g., by adjusting the amount of power or the flow of heating fluid to the filler delivery tube). Additionally, or alternatively, filler delivery unit 220 comprises a tube flow sensor 240 that is configured to determine the flow rate of the filler material flowing through filler delivery tube 228. Additionally, or alternatively, filler delivery unit 220 comprises a tube flow control unit 242 that is configured to adjust the flow rate of the filler material flowing through filler delivery tube 228 (e.g., by adjusting the speed of filler pump 230 or the position of the flow control valve).

In some embodiments, vessel temperature sensor 232, vessel heating unit 234, tube temperature sensor 236, tube heating unit 238, tube flow sensor 240, and/or tube flow control unit 242 are operatively coupled to a processing unit 244. Processing unit 244 comprises a suitable processor such as, for example, a general processor, a digital signal processor, an application specific integrated circuit, a field programmable gate array, an analog circuit, a digital circuit, a server processor, or combinations thereof. Processing unit 244 can be configured as a single device or a combination of devices, such as associated with a network or distributed processing. Processing unit 244 is configured to implement a suitable processing strategy such as, for example, multi-processing, multi-tasking, parallel processing, remote processing, centralized processing, or combinations thereof. Processing unit 244 can be responsive to or operable to execute instructions stored as part of software, hardware, integrated circuits, firmware, microcode, or combinations thereof. For example, processing unit 244 is configured to control components of filler delivery unit 220 (e.g., vessel temperature sensor 232, vessel heating unit 234, tube temperature sensor 236, tube heating unit 238, tube flow sensor 240, and/or tube flow control unit 242). In some embodiments, processing unit 244 comprises a memory (e.g., ROM and/or RAM), a storage device (e.g., a hard drive, a flash drive, a CD-ROM, and/or a DVD), a user input device (e.g., a keyboard, a mouse, and/or a touch-screen), an output device (e.g., a display and/or a light), an input/output device (e.g., a network card and/or a serial bus), an operating system (e.g., a Microsoft Windows operating system), an application program and data, or combinations thereof.

The filler material in the liquid state is applied to the glass sheet. In some embodiments, applicator member 202 is used to apply the filler material in the liquid state to the surface (e.g., first major surface 300) of the glass sheet as shown in FIG. 2. For example, the filler material in the liquid state is delivered to applicator member 202 at a rate of about 0.1 mL/s to about 1 mL/s. Additionally, or alternatively, the filler material in the liquid state is delivered to applicator member 202 at a rate of about 1 drip/s to about 5 drips/s. The rate of delivery of the filler material can depend, for example, on the speed at which the glass sheet is moved relative to the applicator member, the thickness of the glass sheet, the length of the applicator member, and/or the desired width of the impregnated region of the glass sheet.

In some embodiments, the filler material in the liquid state is introduced into a contact zone between applicator member 202 and the glass sheet. For example, filler delivery tube 228 comprises a nozzle positioned adjacent to applicator member 202 to direct the filler material in the liquid state toward the contact zone. A volume of filler material in the liquid state can build up within the contact zone, which can aid in spreading the filler material across at least a portion of the width of the glass sheet. In some embodiments, applicator member 202 comprises an edge guard 206 as shown in FIG. 2. For example, edge guard 206 comprises a plate with a larger diameter than applicator member 202 and coupled to an outside end of the applicator member. Edge guard 206 is positionable adjacent to the edge of the glass sheet to help maintain the filler material on the glass sheet. For example, edge guard 206 extends inward toward the interior of the glass sheet beyond first surface 300 to help prevent the filler material from flowing off the edge of the glass sheet.

Applicator member 202 can help to spread the filler material across at least a portion of the width of the glass sheet. For example, applicator member 202 contacts the glass sheet at a contact pressure of about 2 MPa to about 5 MPa. In some embodiments, applicator member 202 comprises a textured outer surface as shown in FIG. 2. For example, the textured outer surface can be grooved, ridged, knurled, or otherwise textured. The textured outer surface of applicator member 202 can engage the glass sheet to help to apply the filler material to the surface of the glass sheet.

The filler material in the liquid state is wicked from the surface of the glass sheet into the interior of the glass sheet. For example, the filler material is drawn into the voids between the glass soot particles of the glass sheet (e.g., by capillary forces). Thus, a region of the glass sheet is impregnated with the filler material. In some embodiments, the filler material is drawn from one major surface of the glass sheet to the opposing major surface of the glass sheet. Thus, the filler material is drawn into substantially the entire thickness of the impregnated region of the glass sheet. The impregnated region extends longitudinally along the glass sheet and at least partially across the width of the glass sheet. In some embodiments, the impregnated region is disposed at an edge of the glass sheet. Applying the filler material with applicator member 202 can help to work the filler material into the interior of the glass sheet more effectively than applying the filler material by a non-contact method such as spraying.

Although filler application unit 200 is described as including applicator member 202 and backing member 204, other embodiments are included in this disclosure. For example, in other embodiments, two applicator members can be positioned opposite one another to engage opposing major surfaces of the glass sheet. In such embodiments, the filler material in the liquid state can be applied to both major surfaces, which can increase the speed at which the region of the glass sheet is impregnated with the filler material. Thus, in various embodiments, the filler material can be applied to one or both major surfaces of the glass sheet.

The filler material is solidified subsequent to the impregnating step to form a glass/filler composite region of the glass sheet. For example, in some embodiments, the filler material in the impregnated region of the glass sheet is cooled to a temperature below the melting temperature of the filler material to solidify the filler material and form the glass/filler composite region. In some embodiments, cooling the filler material comprises passively cooling the filler material. For example, passively cooling the filler material comprises waiting a sufficient time to allow the filler material to be cooled by contact with the glass sheet and/or ambient conditions (e.g., a local ambient temperature of about 20° C. to about 100° C.). In other embodiments, cooling the filler material comprises actively cooling the filler material. For example, actively cooling the filler material comprises directing a cooling fluid (e.g., air, nitrogen, water, or another suitable fluid) toward the filler material. In some embodiments, the temperature of the glass sheet is less than the melting temperature of the filler material such that impregnating the glass sheet with the filler material causes the filler material to begin cooling. For example, filler application unit 200 can be located at a longitudinal position at which the glass sheet has a temperature of about 20° C. to about 100° C. Upon solidification of the filler material, the impregnated region of the glass sheet becomes the glass/filler composite region of the glass sheet. Thus, the glass/filler composite region extends longitudinally along the glass sheet and at least partially across the width of the glass sheet. The width of the glass sheet corresponds to a transverse direction indicated by double-headed arrow 203. In some embodiments, the glass/filler composite region is disposed at an edge of the glass sheet.

In some embodiments, applicator member 202 comprises a first applicator member 202a and a second applicator member 202b as shown in FIG. 2. First applicator member 202a and second applicator member 202b are spaced from one another to engage different regions of the glass sheet. For example, first applicator member 202a is positioned to engage a first edge region of the glass sheet extending longitudinally along a first edge 304 of the glass sheet. Additionally, or alternatively, second applicator member 202b is positioned to engage a second edge region of the glass sheet extending longitudinally along a second edge 306 of the glass sheet opposite first edge 304. In some embodiments the glass sheet comprises a central region positioned transversely between the first edge region and the second edge region. First applicator member 202a and second applicator member 202b can be independent of one another as shown in FIG. 2 or coupled to one another (e.g., by an axle).

In some embodiments, the filler material in the liquid state is applied to the first edge region of the glass sheet by first applicator member 202a and to the second edge region of the glass sheet by second applicator member 202b. Thus, each of the first edge region and the second edge region of the glass sheet is impregnated with the filler material. Subsequent to the impregnating step, the filler material is solidified. Thus, each of the first edge region and the second edge region of the glass sheet comprises a glass/filler composite region. The glass/filler composite region of the glass sheet can be more durable than the region of the glass sheet that is substantially free of the filler material (e.g., the central region of the glass sheet). Thus, the glass sheet can be engaged at the glass/filler composite regions without causing substantial damage to the glass sheet.

In some embodiments, the system comprises a glass sheet guiding unit configured to guide movement of the glass sheet and/or tension the glass sheet in the transverse direction. One exemplary embodiment of a glass sheet guiding unit 400 is shown in FIG. 1. In some embodiments, glass sheet guiding unit 400 is positioned downstream of filler application unit 200 in the longitudinal direction. Thus, the glass sheet comprising the glass/filler composite region is advanced longitudinally to glass sheet guiding unit 400. Glass sheet guiding unit 400 engages the glass/filler composite region of the glass sheet. In some embodiments, such engagement by glass sheet guiding unit 400 helps to support and/or guide movement of the glass sheet. Additionally, or alternatively, such engagement by glass sheet guiding unit 400 helps to tension the glass sheet in the transverse direction, which can aid in densifying a portion of the glass sheet (e.g., by maintaining the glass sheet in a substantially planar configuration during sintering).

Glass sheet guiding unit 400 comprises one or more glass sheet guiding devices 402 configured to engage a major surface of the glass sheet. For example, glass sheet guiding unit 400 comprises a first glass sheet guiding device 402a configured to engage first major surface 300 of the glass sheet and a second glass sheet guiding device 402b positioned opposite the first glass sheet guiding device and configured to engage second major surface 302 of the glass sheet. Thus, the glass sheet is clamped between first glass sheet guiding device 402a and second glass sheet guiding device 402b. In some embodiments, lengths of first glass sheet guiding device 400a and second glass sheet guiding device 400b are less than the width of the glass sheet. For example, first glass sheet guiding device 400a and second glass sheet guiding device 400b are configured to engage the first edge region and/or the second edge region of the glass sheet without engaging the central region of the glass sheet disposed between the first edge region and the second edge region. Thus, glass sheet guiding unit 400 is configured to engage the glass/filler composite region of the glass sheet without engaging a region of the glass sheet that is substantially free of the filler material (e.g., the central region of the glass sheet).

In some embodiments, glass sheet guiding unit 400 comprises a third glass sheet guiding device 402c configured to engage first major surface 300 of the glass sheet and a fourth glass sheet guiding device 402d positioned opposite the third glass sheet guiding device and configured to engage second major surface 302 of the glass sheet. Thus, the glass sheet is clamped between third glass sheet guiding device 402c and fourth glass sheet guiding device 402d. In some embodiments, lengths of third glass sheet guiding device 400c and fourth glass sheet guiding device 400d are less than the width of the glass sheet. For example, third glass sheet guiding device 400c and fourth glass sheet guiding device 400d are configured to engage the first edge region and/or the second edge region of the glass sheet without engaging the central region of the glass sheet disposed between the first edge region and the second edge region.

In some embodiments, glass sheet guiding device 402 comprises one or more guiding rolls as shown in FIG. 1. In other embodiments, the glass sheet guiding device can comprise one or more guiding belts or other suitable guiding devices. Glass sheet guiding device 402 can be rotatable or otherwise movable, and such rotation or movement can be active or passive as described with respect to applicator members 202.

In some embodiments, the glass sheet or a portion thereof is sintered to form a densified glass region of the glass sheet. For example, the glass sheet or a portion thereof is passed through a sintering zone 500 of a sintering unit as shown in FIG. 1. In some embodiments, the sintering unit is positioned downstream of filler application unit 200 in the longitudinal direction. Additionally, or alternatively, the sintering unit is positioned downstream of glass sheet guiding unit 400 in the longitudinal direction or at approximately the same longitudinal position as the glass sheet guiding unit. Thus, the glass sheet comprising the glass/filler composite region is advanced longitudinally to the sintering unit. The sintering unit heats a sintering region of the glass sheet to form a densified glass region. The sintering unit heats the sintering region of the glass sheet using a suitable heating device such as, for example, a torch, an induction heater, a resistance heater, a radiative heater, a laser, or combinations thereof. In some embodiments, the sintering region of the glass sheet is passed through sintering zone 500 of the sintering unit to heat the sintering region of the glass sheet to a sufficiently high temperature for a sufficient period of time to convert the sintering region of the soot sheet into densified glass. For example, in some embodiments, the sintering region of the glass sheet is heated to a sintering temperature of at least about 800° C., at least about 1000° C., at least about 1400° C., or at least about 1500° C. Additionally, or alternatively, the sintering region of the glass sheet is heated to a sintering temperature of at most about 1800° C. The sintering temperature of the glass sheet can depend on the composition of the glass soot particles of the glass sheet. For example, in some embodiments, the glass soot particles comprise or consist essentially of silica, which can be doped or non-doped.

In some embodiments, at least a portion of the central region of the glass sheet is sintered to form the densified glass region. Additionally, or alternatively, at least a portion of the filler material of the glass/filler composite region remains in the solid state during sintering of the central region of the glass sheet. For example, at least a portion of the central region of the glass sheet is sintered without melting at least a portion of the filler material of the glass/filler composite region of the glass sheet. In some embodiments, substantially all of the filler material of the glass/filler composite region remains in the solid state during sintering of the central region of the glass sheet.

In some embodiments, the glass sheet is tensioned in the transverse direction during sintering of a portion of the glass sheet. For example, glass sheet guiding device 400 tensions the glass sheet in the transverse direction. Such tensioning of the glass sheet can help to avoid sagging of the glass sheet during sintering. Additionally, or alternatively, such tensioning can aid in thinning the glass sheet during sintering.

In some embodiments, the glass sheet, sintered or unsintered, is severed into discreet pieces by a cutting device. For example, the glass sheet is severed by laser cutting. Such discrete pieces of the glass sheet can be used as they are or subjected to post-processing such as, for example, edge removal, coating, polishing, or combinations thereof. In other embodiments, a long ribbon of the glass sheet, sintered or unsintered, is reeled by a reeling device 600 into a roll of the glass sheet. Suitable spacing materials such as, for example, paper, cloth, coating materials, or combinations thereof can be inserted between the adjacent glass surfaces in the roll to avoid direct contact therebetween. In some embodiments, the edge regions (e.g., the glass/filler composite region) of the glass sheet is removed before the glass sheet is reeled into the roll. In other embodiments, the edge regions remain on the glass sheet in the roll. This can aid in protecting the edges of the rolled glass sheet (e.g., during transportation and/or storage).

In some embodiments, a region of the glass sheet is impregnated with the filler material as described herein. The glass sheet comprises a first region comprising a glass/filler composite and a second region that is substantially free of the filler material. The glass/filler composite comprises a plurality of glass soot particles and a filler material in a solid state disposed within voids between the glass soot particles. For example, the glass/filler composite comprises a plurality of glass soot particles dispersed within a filler material in a solid state. In some embodiments, the first region (e.g., the glass/filler composite region) is disposed at an edge of the glass sheet. For example, the first region comprises the first edge region extending longitudinally along the first edge of the glass sheet and the second edge region extending longitudinally along the second edge of the glass sheet opposite the first edge, and the second region comprises the central region positioned between the first edge region and the second edge region. Additionally, or alternatively, at least a portion of the central region comprises densified glass.

In some embodiments, the glass sheet comprises a thickness of at most about 100 µm, at most about 50 µm, at most about 30 µm, or at most about 10 µm. Additionally, or alternatively, the glass sheet comprises a thickness ranging from about 10 µm to about 300 µm, from about 10 µm to about 200 µm, from about 20 µm to about 300 µm, from about 20 µm to about 200 µm, from about 30 µm to about 300 µm, from 30 µm to about 200 µm, from about 50 µm to about 300 µm, or from about 50 µm to about 200 µm. Thus, the glass sheet can be configured as a flexible glass sheet.

In various embodiments, the filler material comprises a suitable filler material capable of filling the voids between adjacent glass soot particles to increase the durability of the glass/filler composite region of the glass sheet. In some embodiments, the filler material comprises a melting point of at least about 40° C., at least about 50° C., or at least about 60° C. Additionally, or alternatively, the filler material comprises a melting point of at most about 110° C., at most about 100° C., at most about 90° C., at most about 80° C., or at most about 70° C. For example, the filler material comprises a melting point of about 40° C. to about 90° C. Such a melting point can enable heating of the filler material to form the filler material in the liquid state and cooling of the filler material to solidify the filler material and form the glass/filler composite region of the glass sheet as described herein. In some embodiments, a ratio of the sintering temperature of the glass sheet to the melting point of the filler material is at least about 5, at least about 7, or at least about 10. Additionally, or alternatively, the ratio of the sintering temperature of the glass sheet to the melting point of the filler material is at most about 50, at most about 40, or at most about 35.

In some embodiments, the filler material comprises a wax. As used herein, the term "wax" refers to an organic, plastic-like material that is solid at ambient temperature and becomes liquid when melted. In some embodiments, the wax is selected from the group consisting of a petroleum wax, a synthetic wax, a mineral wax, a vegetable wax, an animal wax, and combinations thereof. For example, the wax comprises paraffin wax. Examples of petroleum wax include paraffin wax and microcrystalline wax. Examples of synthetic wax include ethylenic polymers such as, for example, polyethylene or polyol ether-ester; chlorinated naphthalenes; and hydrocarbon waxes such as, for example, Fischer-Tropsch waxes. Examples of mineral wax include fossil or Earth waxes such as, for example, ceresin and montan. Examples of vegetable wax include carnauba wax, candelilla wax, and soy wax. Examples of animal wax include beeswax, lanolin, and tallow.

In some embodiments, the filler material comprises a polymeric material having a suitable melting temperature for use as described herein.

In some embodiments, the glass/filler composite region comprises a density of at least about 0.6 g/cc. For example, the glass/filler composite region comprises a density of about 0.6 g/cc to about 1.3 g/cc. In some embodiments, a ratio of the density of the glass/filler composite region (e.g., the first region or the edge region) to the density of the region that is substantially free of the filler material (e.g., the second region or the central region) is at least about 1.5, at least about 1.7, at least about 2, at least about 2.2, or at least about 3. Additionally, or alternatively, the ratio of the density of the glass/filler composite region to the density of the region that is substantially free of the filler material is at most about 10, at most about 5, at most about 4, or at most about 3.5. In some embodiments, the glass/filler composite region comprises at least about 50 wt % of the filler material, at least about 60 wt % of the filler material, at least about 65 wt % of the filler material, at least about 70 wt % of the filler material, at least about 75 wt % of the filler material, or at least about 80 wt % of the filler material. For example, the glass/filler composite region comprises about 50 wt % to about 95 wt % of the filler material.

The glass sheets described herein can be used for a variety of applications including, for example, for cover glass or glass backplane applications in consumer or commercial electronic devices including, for example, LCD, LED, OLED, and quantum dot displays, computer monitors, and automated teller machines (ATMs); for touch screen or touch sensor applications, for portable electronic devices including, for example, mobile telephones, personal media players, and tablet computers; for integrated circuit applications including, for example, semiconductor wafers; for photovoltaic applications; for architectural glass applications; for automotive or vehicular glass applications; for commercial or household appliance applications; for lighting or signage (e.g., static or dynamic signage) applications; or for transportation applications including, for example, rail and aerospace applications.

EXAMPLES

Various embodiments will be further clarified by the following examples.

Examples A-E

Glass soot sheets were formed by depositing glass soot particles on a deposition surface. The glass soot sheets were impregnated with a paraffin wax filler material in a liquid state, and the filler material was solidified to form glass/filler composite sheets. Various properties of the glass soot sheet and the glass/filler composite sheets are given in Table 1.

TABLE 1

Glass/Filler Composite Sheet Properties

| Sample | A | B | C | D | E |
|---|---|---|---|---|---|
| Soot Density (g/cc) | 0.5 | 0.4 | 0.43 | 0.35 | 0.41 |
| Soot Weight (g) | 0.27 | 0.26 | 0.32 | 0.33 | 0.3 |
| Soot Thickness (mm) | 0.31 | 0.4 | 0.43 | 0.45 | 0.41 |
| Sheet Length (mm) | 120 | 117.6 | 136.7 | 146.6 | 131.8 |
| Sheet Width (mm) | 14.5 | 13.7 | 12.8 | 14.2 | 13.5 |
| Glass/Filler Comp. Density (g/cc) | 0.85 | 0.86 | 0.86 | 1.13 | 0.77 |
| Glass/Filler Comp. Weight (g) | 1.11 | 0.83 | 0.86 | 1.7 | 0.91 |
| Glass/Filler Comp. Thickness (mm) | 0.75 | 0.6 | 0.57 | 0.72 | 0.66 |

TABLE 1-continued

Glass/Filler Composite Sheet Properties

| Sample | A | B | C | D | E |
|---|---|---|---|---|---|
| Glass/Filler Comp. Wax (wt. %) | 76 | 69 | 63 | 81 | 67 |

Comparative Examples F-J

Glass soot sheets were formed by depositing glass soot particles on a deposition surface. The glass soot sheets were not impregnated with a filler material. Various properties of the glass soot sheets are given in Table 2.

TABLE 2

Glass Soot Sheet Properties

| Sample | F | G | H | I | J |
|---|---|---|---|---|---|
| Soot Density (g/cc) | 0.38 | 0.35 | 0.37 | 0.36 | 0.43 |
| Soot Weight (g) | 0.2 | 0.2 | 0.31 | 0.25 | 0.31 |
| Soot Thickness (mm) | 0.4 | 0.46 | 0.42 | 0.44 | 0.41 |
| Sheet Length (mm) | 97.2 | 91 | 138.7 | 119.3 | 130.9 |
| Sheet Width (mm) | 13.5 | 13.8 | 14.5 | 13.1 | 13.5 |

The glass/filler composite sheets of Examples A-E were more durable than the glass soot sheets of Examples F-J, even though the soot densities of the sheets were similar.

It will be apparent to those skilled in the art that various modifications and variations can be made without departing from the spirit or scope of the invention. Accordingly, the invention is not to be restricted except in light of the attached claims and their equivalents.

What is claimed is:

1. A method comprising:
   impregnating a region of a glass sheet with a filler material in a liquid state by filling interstitial voids within the region of the glass sheet with the filler material, the glass sheet comprising a plurality of glass soot particles; and
   solidifying the filler material subsequent to the impregnating step to form a glass/filler composite region of the glass sheet, wherein the glass/filler composite region comprises a first edge region extending longitudinally along a first edge of the glass sheet and a second edge region extending longitudinally along a second edge of the glass sheet opposite the first edge, and the glass sheet further comprises a central region positioned between the first edge region and the second edge region and substantially free of the filler material.

2. The method of claim 1, wherein the impregnating step comprises:
   applying the filler material in the liquid state to a surface of the glass sheet; and
   wicking the filler material in the liquid state from the surface of the glass sheet into an interior of the glass sheet.

3. The method of claim 2, wherein the filler material is drawn into the entire thickness of the impregnated region during the wicking.

4. The method of any of claim 1, further comprising:
moving the glass sheet in a longitudinal direction; and
engaging the glass/filler composite region of the glass sheet with a guiding device to tension the glass sheet in a transverse direction.

5. A method comprising:
impregnating a region of a glass sheet with a filler material in a liquid state by filling interstitial voids within the region of the glass sheet with the filler material, the glass sheet comprising a plurality of glass soot particles;
solidifying the filler material subsequent to the impregnating step to form a glass/filler composite region of the glass sheet; and
heating a region of the glass sheet that is substantially free of the filler material to form a densified glass region of the glass sheet, at least a portion of the filler material in the glass/filler composite region of the glass sheet remaining in a solid state during the heating step.

6. The method of claim 5, wherein the impregnating step comprises:
applying the filler material in the liquid state to a surface of the glass sheet; and
wicking the filler material in the liquid state from the surface of the glass sheet into an interior of the glass sheet.

7. The method of claim 6, wherein the filler material is drawn into the entire thickness of the impregnated region during the wicking.

8. The method of any of claim 5, further comprising:
moving the glass sheet in a longitudinal direction; and
engaging the glass/filler composite region of the glass sheet with a guiding device to tension the glass sheet in a transverse direction.

9. A method comprising:
impregnating a first region of a glass sheet with a filler material in a liquid state by filling interstitial voids within the first region of the glass sheet with the filler material, the glass sheet comprising a plurality of glass soot particles; and
solidifying the filler material, subsequent to the impregnating step, to form a glass/filler composite of the glass sheet in the first region while maintaining a second region of the glass sheet that is substantially free of the filler material.

10. The method of claim 9, further comprising heating the second region of the glass sheet to form a densified glass region of the glass sheet.

11. The method of claim 9, wherein the first region is disposed at an edge of the glass sheet.

12. The method of claim 11, wherein the glass sheet is in the form of a ribbon.

13. The method of claim 11, the first region comprises the first edge region extending longitudinally along the first edge of the glass sheet and wherein the glass sheet further comprises a second edge region extending longitudinally along a second edge of the glass sheet opposite the first edge that comprises glass/filler composite.

14. The method of claim 13, wherein the glass sheet comprises a central region positioned between the first edge region and the second edge region, and wherein the second region of the glass sheet that is substantially free of the filler material is the central region.

15. The method of claim 14, wherein at least a portion of the central region comprises densified glass.

16. The method of claim 9, wherein a ratio of density of the first region to density of the second region is at least about 1.5.

17. The method of claim 9, wherein the glass soot particles comprise silica.

18. The method of claim 17, wherein the glass soot particles are doped.

19. The method of claim 17, wherein the glass soot particles are connected and/or bonded with at least some of the other glass soot particles proximate thereto.

20. The method of claim 19, wherein the glass soot particles are at least partially melted together with at least some of the other glass soot particles proximate thereto.

* * * * *

UNITED STATES PATENT AND TRADEMARK OFFICE
CERTIFICATE OF CORRECTION

PATENT NO. : 9,919,958 B2  
APPLICATION NO. : 14/799201  
DATED : March 20, 2018  
INVENTOR(S) : Daniel Warren Hawtof et al.

Page 1 of 1

It is certified that error appears in the above-identified patent and that said Letters Patent is hereby corrected as shown below:

On the Title Page

Item (72) Inventors, Line 5, delete "NY (US);" and insert -- NJ (US); --, therefor.

In the Claims

In Column 16, Line 13, Claim 13, after "11," insert -- wherein --.

Signed and Sealed this
Twelfth Day of May, 2020

Andrei Iancu
*Director of the United States Patent and Trademark Office*